Patented May 6, 1941

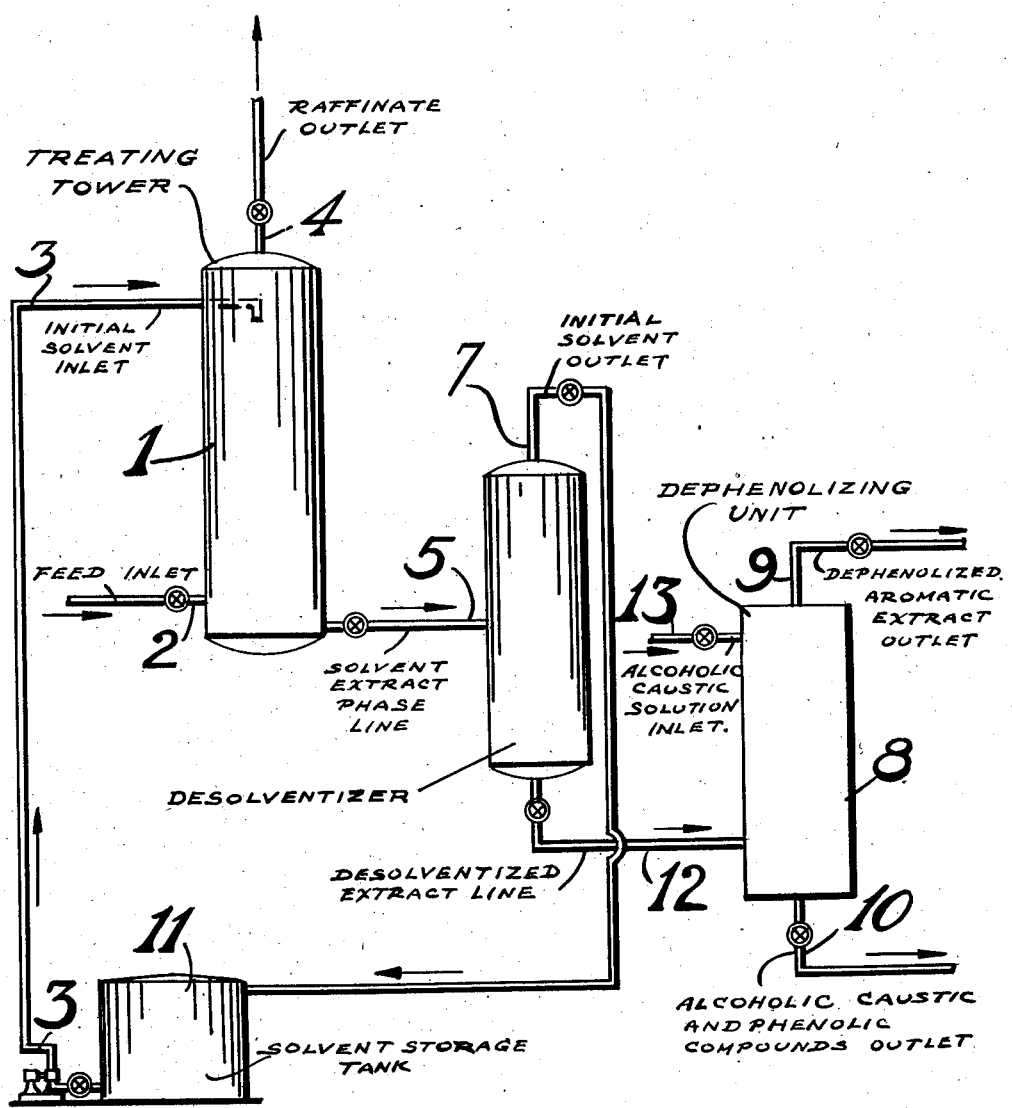

2,240,727

UNITED STATES PATENT OFFICE 2,240,727

EXTRACTION OF PHENOLIC COMPOUNDS FROM MINERAL OILS

Hans G. Vesterdal, Elizabeth, N. J., assignor to Standard Oil Development Company, a corporation of Delaware Application August 27, 1938, Serial No. 227,040

3 Claims. (Cl. 196—13)

The present invention relates to an improved process of segregating and recovering valuable high molecular weight phenolic compounds which are naturally present in certain type mineral oils. The invention especially relates to an economical process for recovering these materials from particular fractions of petroleum oils. The process of the present invention recovers these valuable high molecular weight phenolic compounds by subjecting a mineral oil to an initial treatment with a solvent of the class which has a preferential selectivity for the more aromatic type compounds under conditions to form a solvent extract phase and a raffinate phase, separates the respective phases and removes the solvent from the solvent extract phase, then removes the phenolic compounds from the extract phase by treatment with a suitable solvent.

It is known that valuable phenolic type compounds are present in mineral oils, particularly in lubricating oil distillates, kerosenes, cracked heavy naphtha and cracked heating oils derived from aromatic and naphthenic type crudes. These phenolic compounds are usually high molecular weight phenolic materials and are characterized by the fact that they cannot be economically recovered by means usually employed in recovering phenols, as for example, by extraction with aqueous alkali. These phenolic compounds and their hydrocarbon derivatives are likewise very soluble in hydrocarbons, thus further increasing the difficulty of recovering the same from mineral oils. Various methods have been suggested for recovering these materials from mineral oils and especially lubricating oil distillates. These methods, however, have not been commercially successful.

I have now discovered a process by which these valuable phenolic compounds may be economically recovered from petroleum hydrocarbons on a commercial scale. I have discovered that these valuable phenolic type compounds naturally occurring in petroleum oil may be recovered by treating the petroleum oil with a solvent of the class which has a preferential selectivity for the more aromatic type compounds under conditions to form a solvent extract and a raffinate phase followed by separation of the respective phases and removal of the initial solvent from the solvent extract phase and then treating the extract phase containing a concentrate of phenolic type compounds with a suitable solvent.

The process of my invention may be readily understood by reference to the attached drawing showing one modification of the same. For purposes of illustration, it is assumed that the initial solvent is diethylene glycol mono-methyl ether and that the secondary solvent is a solution of alcoholic caustic. Petroleum oil containing a small quantity of naturally occurring phenolic compounds is introduced into a countercurrent treating tower 1 by means of feed line 2. The petroleum oil flows upwardly through tower 1 contacting the downflowing initial solvent which is introduced into tower 1 from solvent storage 11 by means of line 3. Conditions are maintained on tower 1 to secure a phase separation and the raffinate phase is removed from tower 1 by means of line 4. The solvent extract phase is removed from tower 1 by means of line 5 and introduced into desolventizer 6. In the desolventizer the initial solvent is removed from the solvent extract phase and withdrawn by means of line 7 and led to solvent storage 11. The desolventized extract is removed from desolventizer 6 by means of line 12 and introduced into a dephenolizing unit 8 by means of line 12. In dephenolizing unit 8 the extract contacts the alcoholic caustic solution introduced into unit 8 by means of line 13. The dephenolized aromatic extract is withdrawn from unit 8 by means of line 9 and alcoholic caustic containing the phenolic compounds is withdrawn from unit 8 by means of line 10. The phenolic compounds are then recovered from the alcoholic caustic by any suitable method.

The conditions of the process of the present invention may vary widely. Although any mineral oil containing these naturally occurring phenolic compounds may be used, the process is particularly applicable to petroleum oils which contain these phenolic compounds in relatively small quantities. The process is especially applicable for the recovery of high molecular weight alkylated phenols and the like from petroleum oils which have a phenol content of less than about 1% and is particularly effective in the treatment of petroleum oils which have a phenol content of about 0.5% or less. The initial feed oils containing the naturally occurring high molecular weight phenolic compounds may be treated with any particular solvent which has a preferential selectivity for the more aromatic type petroleum hydrocarbons as compared to the more paraffinic type petroleum hydrocarbons. Solvents of this class are, for example, phenol, furfural, sulfur dioxide, cresol, nitro benzene, aniline, beta beta' dichlor diethyl ether, and the like. It has been found that phenol and diethylene glycol mono-methyl ether are particularly effective. Various mixtures of these solvents may also be employed, as well as mixtures containing substances of the class of liquefied normally gaseous hydrocarbons. The amount of initial solvent used will depend upon the particular solvent being used, the particular mineral oil being treated and also upon the type of phenolic compounds present in the oil being treated, as well as upon the concentration of the phenolic compounds in the oil being treated. In general, it is preferred to use not over one volume of solvent per volume of oil being treated and especially desirable results are secured by using from about 0.1 volume to 0.6 volume of initial solvent per volume of oil being treated. The invention, however, is not to be restricted in this manner, since it may be desirable to use the solvent extracts secured in the solvent treating of petroleum oils. For example, it is well known to separate the relatively more aromatic type compounds from the relatively more paraffinic type compounds of a mineral oil by solvent treating the mineral oil with selective solvents which have a preferential selectivity for one or the other type material. In these processes petroleum oil fractions, such as kerosene, lubricating oils, naphtha, and the like, are usually treated with 1 to 4 volumes of a selective solvent or a mixture of solvents which have a preferential selectivity for aromatic type compounds. Suitable solvents of this class are, for example, phenol, furfural, sulfur dioxide, aniline, nitro benzene, beta beta dichlor diethyl ether, and the like. Various methods of contacting the oil and the solvent are employed. The oil being treated and the solvent are intimately mixed in single or multi stage treaters or in countercurrent solvent treating towers. Various means, such as dispersing trays, contact masses and the like, are employed to secure intimate mixing and maximum efficiency. The process of my invention may solvent treat a petroleum oil in this manner, separate the respective phases, remove the solvent from the extract phase and recover the phenolic compounds from the extract phase by re-extracting with a suitable solvent.

The temperature and pressure conditions maintained in the initial solvent treating operation will vary, depending upon the oil being treated, the solvent or solvent mixture being used and also upon the concentration and type of phenolic compounds present in the feed oil. In general, atmospheric pressure is preferred and a temperature below the complete miscibility temperature of the oil and the solvent.

The solvent extract phase is removed from the initial stage and the initial solvent removed in any suitable manner from the extract. In general, it is preferred to remove the initial solvent by distillation, although other means may be employed, as for example, washing and the like. If distillation is employed, it is desirable that the temperature be maintained relatively low in order to prevent the deterioration of the high molecular weight phenolic compounds. In general, it is preferred to distill at a temperature in the range below 400° F.

The extract free of initial solvent is then re-extracted with a solvent which will remove the phenolic compounds from the extract. Suitable solvents are, for example, an alcoholic caustic solution or a strong aqueous caustic solution. A particularly desirable solvent is methyl alcoholic caustic. The aromatic extract is removed from the caustic extract solution and the petroleum phenols are recovered from this solution by means of acidification with a suitable acid, as for example, sulfuric acid or hydrochloric acid, or with carbon dioxide.

The volume of solvent used to recover the phenolic compounds from the extract will depend upon the particular solvent being used, as well as upon the type of phenolic compounds present in the extract and the concentration of the same. In general, from about .001 to 1.0 volume of caustic solution are used per volume of extract being treated. For example, when methyl alcoholic caustic is employed, it is preferred to use a saturated solution of sodium hydroxide in substantially anhydrous methyl alcohol, in the ratio of from .005 to .1 volume of solvent per volume of extract being treated. When using strong aqueous caustic, for example, 40° Baumé sodium hydroxide, it is preferred to use amounts varying from 0.5 to 1.5% by weight of caustic solution, depending upon the phenol content of the extract. When using methyl alcoholic caustic, the preferred alkali strength in methyl alcohol is between 8% and 15% or higher. An increased temperature and superatmospheric pressure are sometimes necessary.

In order to further illustrate the invention, the following examples are given which should not be construed as limiting the invention in any manner whatsoever.

*Example I*

A Panhandle lubricating oil distillate was solvent treated with a solvent comprising a mixture of cresylic acid and propane under conditions to form a raffinate and solvent extract phase. The solvent extract phase was separated from the raffinate and the solvent removed from the extract by distillation. The solvent-free extract was then steam distilled and 100 parts by weight of the distillate boiling in the range from about 600 to 715° F. were separated and dissolved in 54° A. P. I. naphtha. The solution contained 35 parts by weight of distillate per 100 volumes of solution. This solution was countercurrently extracted at room temperature with a saturated solution of sodium hydroxide in 95% methyl alcohol. Approximately 160 parts by volume of sodium hydroxide solution were utilized. The extract was acidified with concentrated hydrochloric acid to release the phenols and a small quantity of light naphtha added. It was found that the phenolic compounds were not very soluble in the naphtha. The salt solution separated as a bottom layer and was removed. The solvent was removed from the phenol solution by heating up to 400° F. and blowing with carbon dioxide. Approximately 6 parts by weight of phenolic compounds were recovered based upon 100 parts by weight of original distillate.

This material was added to a motor lubricating oil having a gravity A. P. I. of approximately 28 to 30 in a concentration of about 1%. A similar blend was made using the raffinate. Cone tests were run on the respective blends to determine the oxidation rates. The results of these tests were as follows:

```
                                              Cone test*
1% phenolic extract+99% lubricating oil__   .32
1% raffinate+99% lubricating oil _____   .66
```

*Cone test.—A method for determining the tendency of an oil to deposit sludge matter upon a heated metallic surface. It consists in slowly dropping the oil to be tested over a heated metal cone which is generally steel. The cone has a circumferential groove milled out in a screw fashion on the periphery thereby allowing a time of contact of about one minute between the heated steel surface and the oil. A total volume of 60 c. c. of oil is released from a dropping funnel over a period of two hours. The temperature of the cone may be any desired value but for lubricating oils it is preferred to use about 250° C. since it represents approximately the extreme temperature to which oils are ordinarily exposed in the internal combustion engine. After the entire volume of oil is run over the metallic surface the cone is washed with naphtha to completely remove the adhering oil without disturbing the deposit left on the cone. The cone is then weighed and the increase in weight of the cone due to the deposit left thereon by the oil is expressed in milligrams.

From the above data it is readily apparent that the process of the present invention readily extracts the phenolic type compounds from the lubricating oil distillate and that these materials are desirable as oxidation inhibitors.

*Example II*

100 volumes of a petroleum heating oil containing high molecular weight phenols were treated with .7 volume of a 40° Baumé sodium hydroxide solution. The mixture was thoroughly agitated and then centrifuged to separate the spent caustic. The petroleum phenol soaps were separated and recovered by acidification with sulfuric acid. By this method, .08 volume of petroleum phenols were recovered.

Heating oil as described above was solvent extracted with diethylene glycol mono-methyl ether at 130° F., using 2 volumes of solvent per 3 volumes of heating oil. The extract layer was separated and the solvent recovered by washing with water. 100 volumes of the extract were treated with .7 volume of 40° Baumé caustic soda. The mixture was then thoroughly agitated and centrifuged to separate the spent caustic. The petroleum phenol soaps were separated and recovered by acidification with sulfuric acid. With this procedure, .25 volume of petroleum phenols were recovered.

By the above data it may readily be seen that in accordance with the process of the present invention it is possible to recover approximately 3 times the quantity of petroleum phenols per volume of oil being treated over the process of treating the heating oil directly with caustic.

The present invention is not to be limited by any theory or mode of operation, but only by the following claims in which it is intended to claim all novelty insofar as the prior art permits.

I claim:

1. Process of recovering naturally occurring phenolic type compounds from mineral oil comprising treating said oil with di-ethylene glycol mono-methyl ether under conditions to form a raffinate phase and a solvent extract phase, removing the solvent aromatic extract phase containing the phenolic type compounds, separating the solvent therefrom, then re-extracting the solvent free aromatic extract containing the phenolic type compounds with a selective solvent to remove the phenolic type compounds, separating the phenolic extract and recovering the phenols therefrom.

2. Process of recovering naturally occurring petroleum phenolic compounds from petroleum oils comprising treating said oils with di-ethylene glycol mono-methyl ether under conditions to form a raffinate phase and a solvent extract phase, separating the solvent extract phase containing the petroleum phenolic compounds, removing the di-ethylene glycol mono-methyl ether therefrom, then re-extracting the extract phase with an alcoholic caustic solution, removing the phenolic extract and recovering the phenolic type compounds.

3. Process of recovering naturally occurring high molecular weight phenolic type compounds from petroleum oils comprising treating a feed oil in an initial stage with from about 0.1 to 0.6 volume of di-ethylene glycol mono-methyl ether under conditions to form a solvent extract phase and a raffinate phase, separating the respective phases and removing the di-ethylene glycol mono-methyl ether therefrom, re-extracting said solvent-free extract in a secondary stage with an alcoholic caustic solution, separating a secondary extract containing the high molecular weight phenolic type compounds and recovering said compounds therefrom.

HANS G. VESTERDAL.